June 3, 1941.   W. A. PATTON   2,244,213
VALVE STRUCTURE
Filed Jan. 12, 1939   3 Sheets-Sheet 1

INVENTOR
Willis A. Patton
BY George Douglas Jones
ATTORNEY

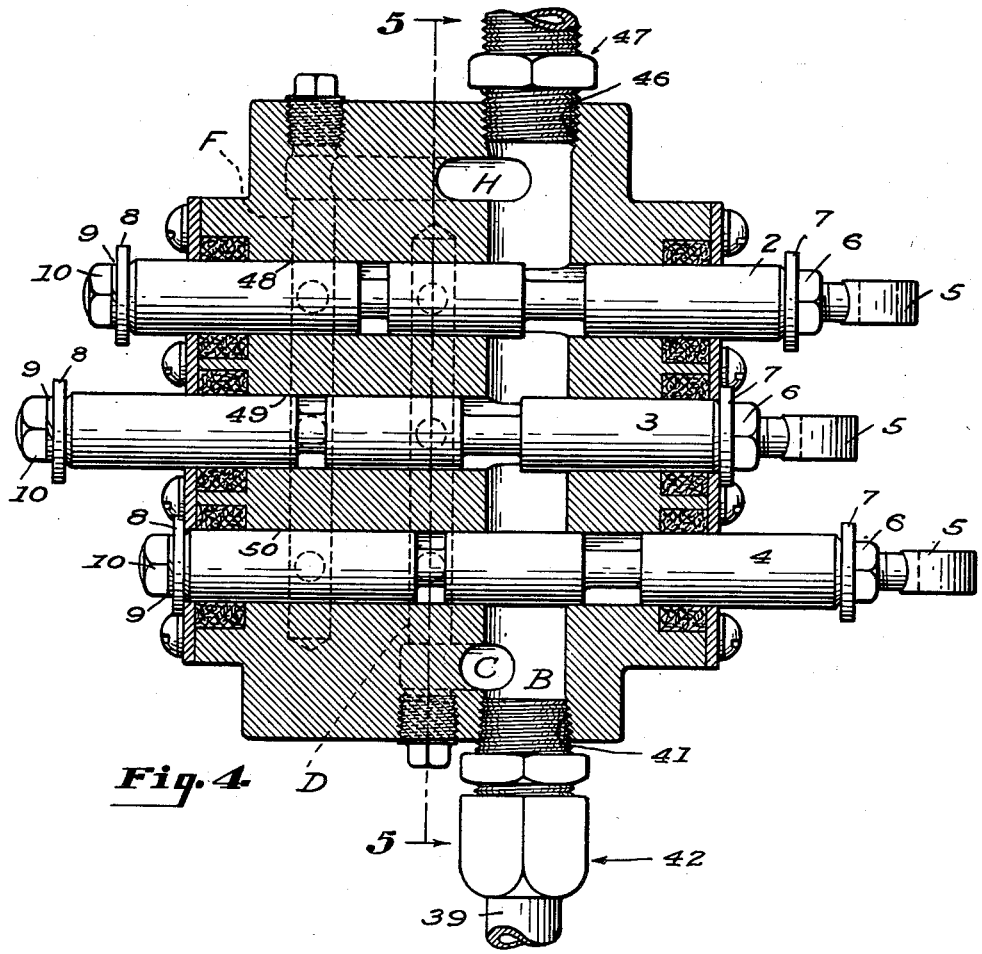
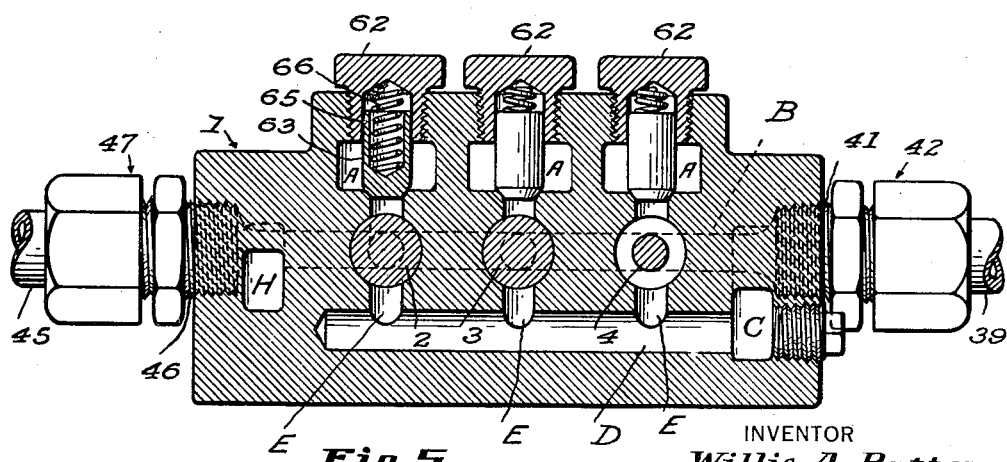

June 3, 1941. W. A. PATTON 2,244,213
VALVE STRUCTURE
Filed Jan. 12, 1939   3 Sheets-Sheet 3

INVENTOR
Willis A. Patton
BY George Douglas Jones
ATTORNEY

Patented June 3, 1941

2,244,213

UNITED STATES PATENT OFFICE 2,244,213

VALVE STRUCTURE

Willis A. Patton, Cleveland, Ohio, assignor to Hydraulic Control Engineering Company, Cleveland, Ohio Application January 12, 1939, Serial No. 250,659

5 Claims. (Cl. 277—57)

The present invention relates to an improved control means for fluid pressure systems, to be used in connection with a system wherein fluid pressure is built up and used to operate lifting and lowering apparatus, such as earth moving machinery and the like, and is directed more especially to a fluid control valve and mechanism therefor, for positively controlling the flow of fluid in the operating members.

In the past, it has been customary in the design and production of fluid control valves to rely entirely on the fit of the piston or plug in a bore of the control valve to hold the pressure on either side of the operated ram or cylinder in order to prevent leakage back to the fluid reservoir.

It is also customary practice to install in a system of this type a check valve to prevent back or return flow of the fluid to the reservoir. This check valve is always installed between the pump and the control valve.

Control valves designed and built for the above mentioned purpose are of necessity extremely bulky due to the fact that the valve must work freely and remain in constant balance. Since bulk is very undesirable in mechanism used for this purpose, the present invention, therefore, comprehends a compact well-balanced unit, positive in action and simple in design.

A specific object of the present invention is to provide a compact fluid control valve having single or multiple combinations for the operation of one or more hoists or similar mechanism operable either individually or collectively.

Another object of the present invention relates to a fluid control valve having mechanism therein so designed and arranged as to provide a by-pass passage through which the fluid from the pump may pass and return to the reservoir under no pressure, when the valve mechanism is in the "hold" or neutral position. The only pressure on the pump when the control means are in that position is the frictional resistance of the by-pass passage and conduit line.

A further obpect of the present invention is to provide for the positive operation of one or more fluid displacement mechanisms (the most commonly used being of the ram or cylinder and piston type), so that at no time during the operation of the control valve will the valve mechanism permit the fluid displacement mechanism or ram to drop unintentionally.

A still further object of the present invention is to provide fluid control means that will operate several rams carrying unequal loads; and in the event that the ram carrying the lighter load is to be operated in advance of the rams carrying heavier loads, the latter will remain in any desired position while the former is in operation.

A further object of the present invention is to provide a fluid control valve having porting so arranged that the movements of the operating plunger or piston are positive, and that the fluid can be so diverted, that a portion flows to the ram or rams while a further portion returns to the reservoir, thereby providing perfect control of the speed of movement of the ram or rams. The regulation of fluid flow is possible by pressure and orifice control and is determined by the position of the lands located in the piston or plug of the valve mechanism and the relation thereof to the ports in the housing. A still further object of the present invention is to provide a fluid control valve having mechanism so arranged that two or more rams carrying different loads may be operated at the same time.

In the present invention the valve mechanism may be arranged to operate either one-way plunger type rams or two-way plunger type rams. In the operation of a one-way plunger type ram, fluid under pressure is applied thereto to extend the ram. The valve mechanism when moved to "open" or lowering position will permit the load on the ram to collapse or close the same and return the fluid to the reservoir.

In the operation of a two-way plunger type ram, the fluid is applied thereto under pressure, the fluid pressing on either side of the piston. When ram movement is desired, the fluid is relieved from one side, returning through the opening or lowering land of the valve to the reservoir and thereby moving the piston in the direction in which the fluid is released.

For a complete understanding of this invention, reference is now made to the accompanying drawings illustrating a preferred embodiment of the invention and including a single fluid control valve and a multiple fluid control valve.

Fig. 4 is a horizontal section of the control valve taken on lines 4—4 of Fig. 2.

Fig. 5 is a sectional view of the control valve taken on line 5—5 of Fig. 4.

Figure 1:
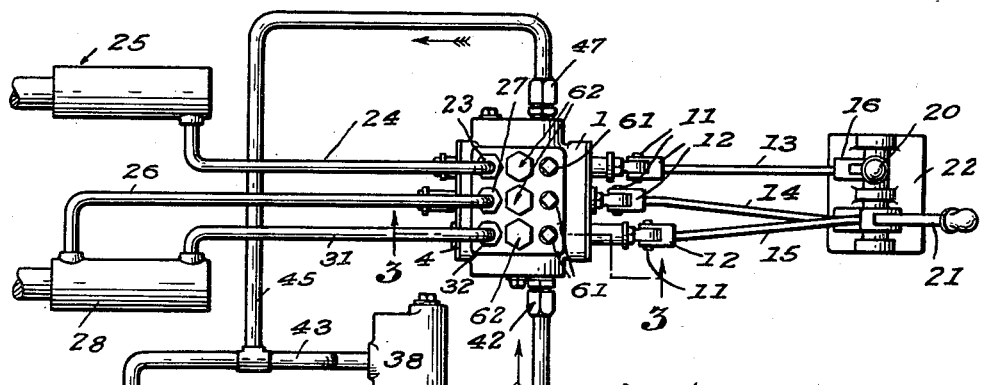
Fig. 1 is a plan view of the fluid control valve installed in a complete hydraulic system.
Figure 2:
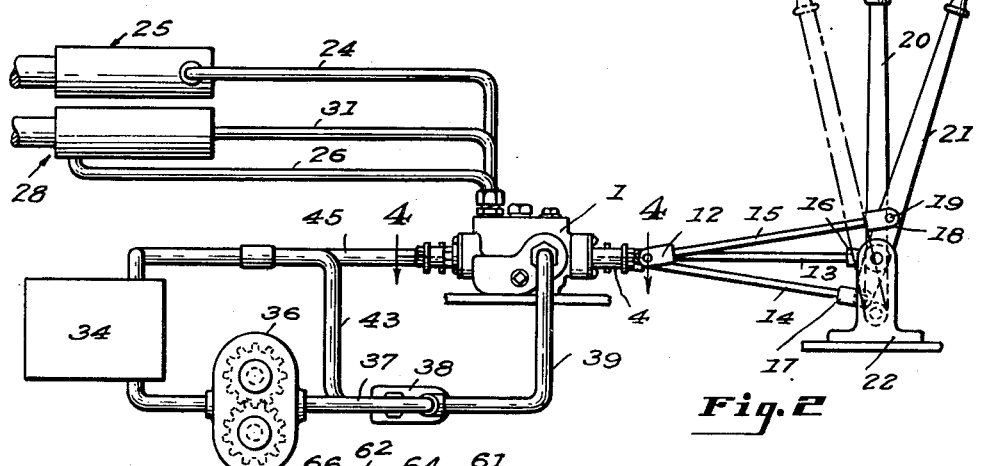
Fig. 2 is a side elevation of the system.

Referring specifically to the drawings, wherein like numerals correspond to like parts, a valve housing 1 is provided with a three-piston valve, the pistons being indicated by the numerals 2, 3 and 4. The ends of the pistons are provided with threaded eye bolts 5 screwed into the ends thereof and held in position by lock nuts 6 in facial engagement with enlarged washers or stop members 7 provided adjacent the piston ends and the lock nuts. The opposite ends of the pistons are each provided with an external thread having a stop member 8 held in position by a lock washer 9 and a nut 10. A pin 11 for each eye bolt 5 connects it to a yoke 12. Secured to the yokes 12 are rods 13, 14, and 15 having at their respective opposite ends rod yokes 16, 17, and 18 secured by means of pins 19 to two lever arms 20 and 21 pivoted on a base member 22. It will be noted that the rod 13 connects to the lever arm 20 and rods 14 and 15 are both joined to lever arm 21 on opposite sides of its pivot point.

Attached to and in fluid communication with the control valve housing or chamber 1 through a port 23 is a conduit 24, which is also secured to and in fluid communication with a one-way plunger type ram 25. Another conduit 26 is also secured to and in fluid communication with the control valve chamber 1 through a port 27, the other end of the conduit 26 being secured to and in fluid communication with a two-way plunger type ram 28. It will be noted that the conduit 26 enters the cylinder of ram 28 at its extreme or left end, as seen in Fig. 1. Another conduit 31 is also in fluid communication with the control valve chamber 1 through a port 32, and opens into the cylinder of ram 28 at the opposite end from conduit 26.

The system thus far described refers to the control valve, lever arms for operating the control valve plugs or pistons (2, 3, 4), the operated rams, and conduits connecting the rams to the control valve. The balance of the system includes a reservoir 34, a conduit 35 in open communication therewith and connecting said reservoir 34 to a pump 36, preferably of the gear type, driven in a conventional manner; a conduit 37 connecting the pump 36 to an unloading type relief valve 38 which is of conventional design; and another conduit 39 secured to conduit 37 at a point between the pump 36 and the relief valve 38, the said conduit 39 being secured to an inlet port 41 of the control valve housing 1 by any suitable means, such as a threaded union joint 42. (See Figs. 4 and 5.) A conduit 43, which may be termed the return conduit, is at one end secured to and in open communication with reservoir 34, the other end being secured to and in open communication with the relief valve 38.

A branch conduit 45 intermediate the conduit 43 is in open communication with the latter, and is connected with an open return port 46 in the control valve housing 1 by conventional means, such as a threaded union 47.

Figure 3:
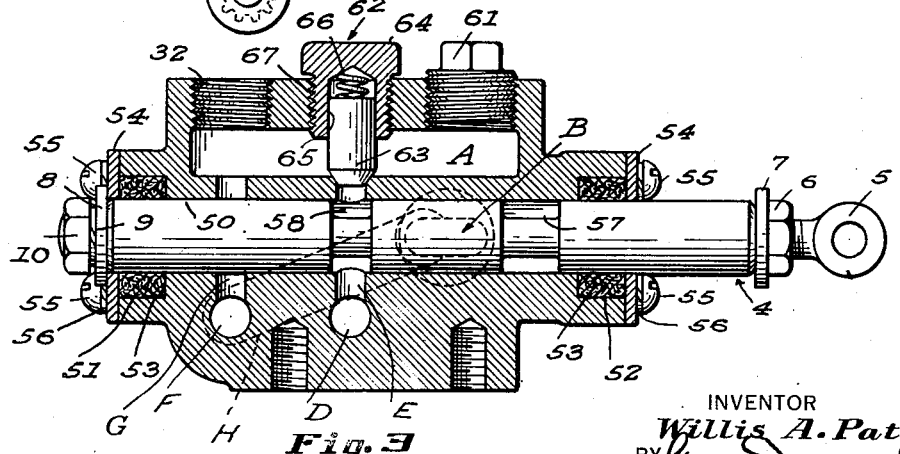
Fig. 3 is a vertical section of the control valve taken on line 3—3 of Fig. 1.

This completes the description of the circuit, and the details of construction and function of the control valve mechanism and of the ducts and ports therefor will now be described. Referring to Fig. 3, valve housing 1 is provided with a plurality of longitudinal cylinder bores 48, 49, 50, one of which is shown at 50 in the said figure. Operating within the cylinder bore 50 is the operating plunger or piston valve 4, identical in all respects with the other two piston valves 2 and 3. At the extreme ends of the bore 50, recesses 51 and 52 are provided to receive therein packings 53, which may be of any suitable material, such as felt. Each packing 53 is securely retained in place by suitable means such as plates 54, each having a bore therethrough of the same diameter as the piston valve (4), the said plates being secured to the valve housing 1 by means of screws 55, and retained in position by means of lock washers 56.

The piston valve 4 is provided with two annular grooves 57 and 58 to register with certain passages (to be described) which connect with various external ports of the control valve housing 1.

The upper portion of the valve housing 1 is provided with longitudinal pressure wells A into one of which port 32 having a threaded wall enters. Ports 27 and 23 also enter into similar wells A, and are provided with threaded walls. Other ports are indicated in Fig. 1 and may be used for additional rams (not shown); conventional pipe plugs 61 may be used to close such additional ports.

Centrally located in the pressure well A and directly over each valve piston is a check valve 62, the said check valve being preferably of the conventional type and comprising a valve member 63 tapered at its lower end, a threaded plug member 64 having a bore 65 therein into which the valve 63 may slide, and a spring 66 located between the bottom of the bore 65 and the valve member 63 in which it is seated (Fig. 5). The plug members 64 are screwed into openings 67 in the top portion of the valve housing 1. Similar check valves (62) of the set are shown in Fig. 5. It is the function of the check valves 62 to prevent at all times the return flow of fluid from the rams 28, 25, to the high pressure side of a transverse fluid passage B in housing 1, and thus to eliminate dropping of said rams.

In order better to disclose the operation of the control valve mechanism of Figs. 1 to 5, it will be necessary to designate additional fluid passages which have been provided in the valve chamber 1. From near the inlet end of the transverse fluid passage B, a downwardly inclined, longitudinal passage C connects with a transverse, high pressure fluid manifold passage D. A series of vertical passages E, E, E, which intercept the longitudinal valve bores 48, 49, 50 join manifold passage D and the respective longitudinal pressure wells A, A, A.

A low pressure fluid passage F extends parallel to passage D and receives exhausted fluid from a second series of vertical passages G, G, G, each one of which intercepts a valve bore, 48, 49 or 50 and extends from a well A. At the outlet end of passage B a downwardly inclined, longitudinal passage H opens into passage F, connecting it to B.

If piston valves 2, 3, and 4 are in hold position, the transverse passage B (Fig. 4) through the valve housing 1 will be open to connect conduit 39 to conduit 45, thus returning pumped fluid directly to reservoir 34.

With piston valve 4 in the position shown, high pressure fluid from conduit 39 will enter passage C and the high pressure manifold passage D and flow past valve groove 58 in vertical passage E. The check valve member 63 will then be opened to admit high pressure fluid into the corresponding well A, which is in open communication with conduit 31 through port 32. In this manner high pressure fluid is supplied to the right hand end of the two-way, plunger type ram 28 indicated in Fig. 1.

At this time, the piston valve 3 will be in a position to exahust the left hand end of said two-way ram 28, since its rod 14 is connected to lever arm 21 on the opposite side of its pivot from the rod 15 which operates piston valve 4. That is, exhaust fluid from the conduit 26 flows past left end groove of piston valve 3 into a corresponding vertical passage G, leading to passage F. From F, the fluid passes into the longitudinal connecting passage H which carries it into the outlet end of passage whence it is returned to the reservoir 34.

Of course the relative position of piston valves 3 and 4 can be reversed relatively to force the plunger of ram 28 in the opposite direction. When these two valves; 3 and 4, are in neutral or hold position, a larger proportion of the pressure fluid entering B will be available for extending the one-way plunger ram 25. Conversely more high pressure fluid will be available for operating ram 28, when valve 2 has its intermediate or hold position.

From this it follows that the two rams, 25, 28 may be operated independently and simultaneously at all times, and that the effective operating force of each may be augmented by operating that one alone.

In the modified combination of control valves and plunger type rams illustrated in Figs. 6 to 10, the conduit 39 of the system shown in Fig. 1 is connected by its threaded union 42 to the inlet side of a valve housing or chamber 101. At the outlet side of the chamber 101, conduit 45 is connected by means of the threaded union 47.

Other details and parts which correspond to those of the principal form of this invention have been given identical numbers.

Figure 6:
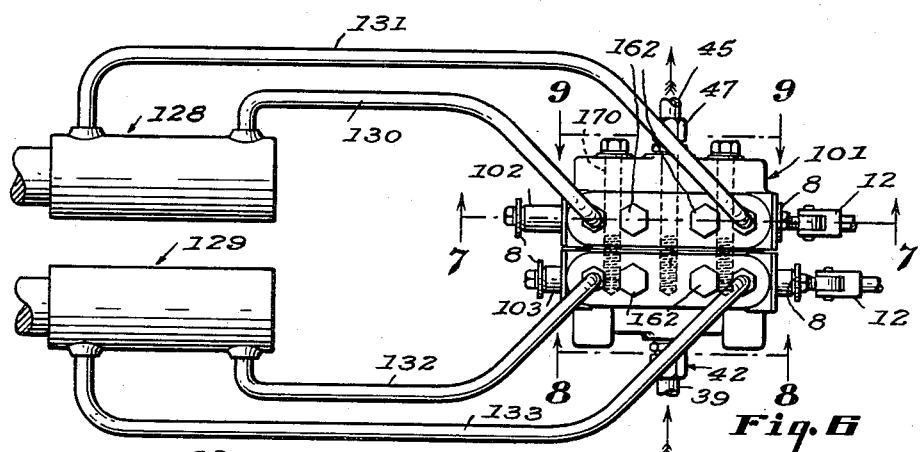
Fig. 6 is a plan view of a modified system wherein the circuits are connected to two-way acting rams.

A pair of piston valves 102 and 103 extend longitudinally of the valve housing 101. These valves control the flow of pressure fluid in the conduits which connect the housing 101 with two plunger type rams, 128 and 129, which are double-acting. Conduits 130 and 131 supply or exhaust fluid at the right and left ends, respectively, of ram 128, as seen in Fig. 6. The ram 129 is similarly served by two conduits 132 and 133, at its right and left ends, respectively.

Figure 7:
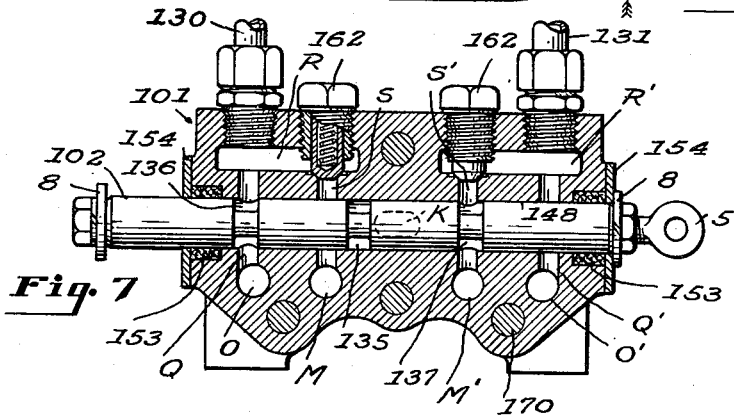
Fig. 7 is a vertical section of a control valve taken on line 7—7 of Fig. 6.
Figures 8, 9:
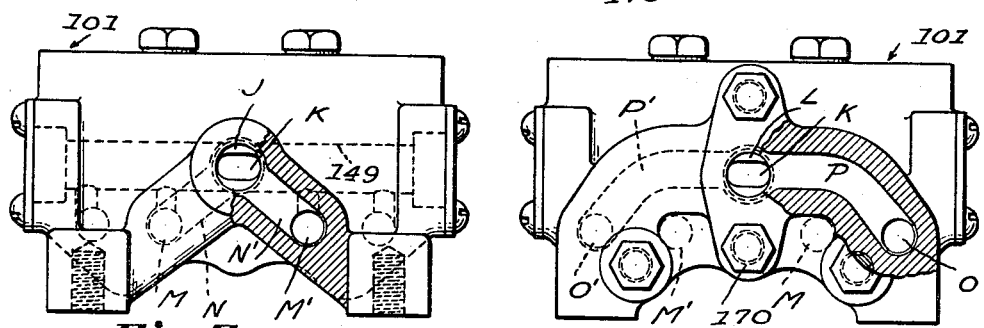
Fig. 8 is a partly sectioned side view of the intake end of the control valve, taken on line 8—8 of Fig. 6.
Fig. 9 is a partly sectioned side view of the return end of the control valve, taken on line 9—9 of Fig. 6.

Fig. 7 shows a central annular groove 135, a left annular groove 136, and a right annular groove 137 in the piston valve 102. The piston valve 103 is provided with three annular grooves (not shown) identical with those in valve 102.

Piston valve 102 which controls ram 128 slides in a longitudinal bore 148 in housing 101, while piston valve 103 for ram 129 slides in a parallel bore 149.

Figure 10:
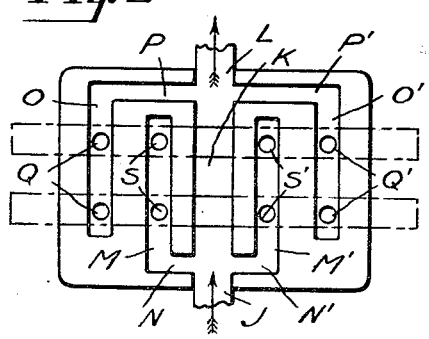
Fig. 10 represents a diagrammatic arrangement of the fluid circuit within the valve housing of Figs. 6 to 9.

Referring to Fig. 10, it will be seen that the pressure fluid enters the valve housing at J, whence it will flow through a central transverse passage K and out of the valve housing at L, providing that the central annular groove 135 of every piston valve is in registration with the transverse passage K. Under these circumstances, the fluid will be returned to the reservoir 34 after circulating idly through passage K. The independently operated piston valves (102, 103) will at this time be in their "hold" or neutral positions, since the corresponding left and right annular grooves, 136 and 137, will be closed by continuous portions of the bores 148, 149.

The housing 101 is provided also with a pair of parallel, transverse passages, M, M' on opposite sides of central passage K. At the inlet end, longitudinal passages N, N', connect the passages or mains M, M' with the high pressure end of passage K.

Above each end of each piston valve 102, 103 is a separate longitudinal pressure well R, R' (Fig. 7) connected to passages M, M' by vertical passages S, S', respectively intercepting bore 148. One-way or check valves 162, 162, close the upper ends of passages S, S' so as to prevent the return flow of fluid therein.

Outwardly of passages S, S', additional parallel passages or mains O and O', respectively, are provided for exhaust purposes. Passages O and O' are joined to the low pressure or outlet end of passage K by means of longitudinal passages P and P', respectively. A vertical passage Q intercepts the bore (148) of each piston valve at its left end (Fig. 7) and connects each pressure well R with passage O. The wells R', R' at the right end of the piston valves are similarly connected to passage O' by vertical passages Q', Q'.

The valve housing 101 is sectional, as shown, and has stud bolts 170 extending transversely thereof for maintaining it in assembled relation.

In the operation of the modified mechanism the following circuits are employed:

When the piston valve 102 in Fig. 7 is placed in a neutral or "hold" position, i. e., so that the groove 135 intercepts the passage K and the upward passages Q and Q', respectively, are closed by said valve the upward passages S and S', respectively, will be likewise closed. If the piston valve 102 is moved into the position shown, the flow of the fluid through the passage K is blocked, and the fluid is diverted through the passages N and N' into the high pressure mains M and M', thence to the passage S', through the groove 137, through the check valve 162 and into the well R'. From the well R' the high pressure fluid passes through conduit 131 to the left end of the piston ram 128, causing the ram to move in the direction to force the fluid from the other end of the ram 128 into the conduit 130 and thence to the well R. The fluid will then exhaust through the passage Q past the groove 136, the main O, the passage P, and to the reservoir 34. If the piston valve 102 is moved to a completely reversed position, the fluid through the passage K is again blocked. The groove 136 will intercept the passage S permitting the fluid that has been diverted to the passage M to pass through the groove 136, through the check valve 162 in to the well R, and through the conduit 130 to the opposite side of the piston type ram 128. The fluid on the other side of the piston will be returned through the conduit 131 into the well R', through the passage Q', through the groove 137, into the main O', through the passage P', into the outlet end of passage K, and through the conduit 45 to the reservoir 34.

It will be noted that in the movement of the piston valve 102 from the neutral position to the position shown the groove 137 will be opened before the valve 102 has completely closed the passage K, permitting the fluid to continue to flow through said passage K until this passage is completely closed. The flattened, elliptical shape of the passage K (and B in Fig. 3) is such that, as it is intercepted by the ungrooved portion of valve 102, it will gradually throttle the volume of fluid through the groove 135 into the passage K until a sufficient back pressure has been built up in passages N' and M' to raise the corresponding valve 162 and start the hydraulic mechanism (128) in movement, part of the fluid being diverted to this movement, the other portion continuing to flow through the groove 135 and the restricted opening between the side of the passage K and the overlapping end of groove 135. This throttling effect permits the slow operation of the mechanism with a constant flow from the fluid pressure pump.

It will also be noted that as the piston valve 102 is returned toward the neutral position from the position shown, that the groove 135 will start to intercept the passage K before the passage S' is completely closed and that as this interception of passages occurs, the pressure built up to operate the ram mechanism will drop to such a point that there will be a flow tendency from the well R' into the passage S'. However, the check valve 162 will then close instantly, eliminating the dropping movement occurring in the operation of other valves.

Besides being supplied from the same high pressure passage, both piston valves of the modified form of this invention, will produce interdependent effects upon their respective fluid pressure mechanisms. The power output of either device will be greater when the piston valve for the other device is in neutral or hold position. When both devices are operated simultaneously, the system is designed to supply them equally with hydraulic power.

Although the invention has been described with certain modifications, it is to be distinctly understood that no limitation is intended thereby, except those limitations which are clearly set forth in the following claims.

Having described my invention, what I claim as new and desire to secure by Letters Patent of the United States is:

1. For use with a hydraulic system comprising a high pressure fluid supply means and a plurality of fluid displacement mechanisms: a control valve chamber having a plurality of bores therein; a piston valve provided with spaced openings operating in each bore; said chamber being provided with a through-passage intersecting the valve bores to by-pass pressure fluid when all of the piston valves are in neutral position so that a corresponding first opening in each valve opens said through-passage, and a pressure well for each valve and having a discharge outlet, each bore of the valve chamber having a first pair of longitudinally spaced ports communicating with opposite ends of the through-passage respectively, and a second pair of bore ports in alignment with the respective ports of the first pair and opening into said pressure well; and a one-way valve in that port of each second pair which is aligned with that port of each first pair which communicates with the through-passage ahead of the bore, said piston valves each having a second valve opening which is positioned between the pairs of aligned ports when the valve is in neutral position and is adapted to connect the aligned ports as the valve is moved to either side of its neutral position.

2. In combination a control valve chamber having three bores therein; a piston valve provided with spaced openings operating in each bore; said chamber being provided with a through-passage intersecting the valve bores to by-pass pressure fluid when all of the piston valves are in neutral position so that a corresponding first opening in each valve opens said through-passage, and a pressure well for each valve and having a discharge outlet, each bore of the valve chamber having a first pair of longitudinally spaced ports communicating with opposite ends of the through-passage respectively, and a second pair of bore ports in alignment with the respective ports of the first pair and opening into said pressure well; a check valve in that port of each second pair which is aligned with that port of each first pair which communicates with the through-passage ahead of the bore, said piston valves each having a second valve opening which is positioned between the pairs of aligned ports when the valve is in neutral position and is adapted to connect the aligned ports as the valve is moved to either side of its neutral position, the valve openings being so spaced that the valve will close the through-passage when one of the aligned pair of ports is connected; means for independently operating one valve; and means for simultaneously operating the other two valves in opposite directions.

3. For use with a hydraulic system comprising a high pressure fluid supply means and a plurality of fluid displacement mechanism: a control valve chamber having a plurality of parallel, longitudinal bores therein; a piston valve provided with three spaced annular openings operating in each bore; said chamber being provided with a transverse through-passage intersecting the valve bores to by-pass pressure fluid when all of the piston valves are in neutral position so that the corresponding intermediate opening in each valve opens said through-passage, and a pair of pressure wells for each valve at opposite ends thereof and each having a discharge outlet, each bore of the valve chamber having at each end a first pair of longitudinally spaced ports communicating with opposite ends of the through-passage respectively, and a second pair of bore ports in alignment with the respective ports of the first pair and opening into said pressure wells; and a one-way valve in that port of each second pair which is aligned with that port of each first pair which communicates with the through-passage ahead of the bore, the endmost openings of each valve being positioned between the corresponding pairs of aligned ports at each end when the valve is in neutral position, and being adapted to connect a pair of aligned ports at each end of the bore as the valve is moved to either side of its neutral position.

4. For use with a hydraulic system comprising a high pressure fluid supply means and a plurality of fluid displacement mechanisms: a control valve chamber having a plurality of parallel, longitudinal bores therein; a piston valve provided with three spaced openings operating in each bore; said chamber being provided with a transverse through-passage of greater width lengthwise of the bore than the intermediate opening of each piston intersecting the valve bores to by-pass pressure fluid when all of the piston valves are in neutral position so that the corresponding intermediate opening in each valve opens said through-passage, and a pair of pressure wells for each valve at opposite ends thereof and each having a discharge outlet, each bore of the valve chamber having at each end a first pair of longitudinally spaced ports communicating with opposite ends of the through-passage respectively, and a second pair of bore ports in alignment with the respective ports of the first pair and opening into said pressure wells; and a one-way valve in that port of each second pair which is aligned with that port of each first pair which communicates with the through-passage ahead of the bore, the endmost openings of each valve being positioned between the corresponding pairs of aligned ports at each end when the valve is in neutral position, and being adapted to connect a pair of aligned ports at each end of the bore as the valve is moved to either side of its neutral position.

5. A valve mechanism comprising a valve chamber having a bore therein; a piston valve operable in said bore and provided with longitudinally spaced openings therethrough, said chamber being formed with a through-passage intercepting the valve bore and alignable with one of the openings extending through said valve; a pressure well in the valve chamber provided with a discharge opening and being also in communication with said bore at two places, one of which also communicates by a separate passage extending from the bore with the through-passage ahead of the bore and the other of which is in open communication by means of a further separate passage extending from the bore with the through passage beyond the bore; and a one-way valve arranged in the pressure well at one place of communication with the bore to prevent the return of pressure fluid therefrom to the through-passage, and another piston valve opening being arranged alternatively to place the valve bore in communication with said two places of the pressure well and the respective passages which join the valve bore to the through-passage, said valve openings being so spaced that the valve will close the through-passage when the pressure well of the chamber is placed in communication with one end of said through-passage.

WILLIS A. PATTON.